United States Patent
Sfez et al.

(10) Patent No.: US 6,521,136 B1
(45) Date of Patent: Feb. 18, 2003

(54) METHOD FOR MAKING THREE-DIMENSIONAL PHOTONIC BAND-GAP CRYSTALS

(75) Inventors: Bruno Gad Sfez, Jerusalem (IL); Zvi Kotler, Tel-Aviv (IL)

(73) Assignee: State of Isreal, Atomic Energy Commision, Soraq Nuclear Research Center (IL)

( * ) Notice: Subject to any disclaimer, the term of this patent is extended or adjusted under 35 U.S.C. 154(b) by 102 days.

(21) Appl. No.: 09/621,564

(22) Filed: Jul. 21, 2000

(30) Foreign Application Priority Data

Jul. 22, 1999 (IL) ................................................ 131037

(51) Int. Cl.[7] ................................................ G03C 5/00
(52) U.S. Cl. .............................. 216/24; 216/38; 216/88; 216/95; 216/100; 430/321; 430/322; 430/945
(58) Field of Search .............................. 216/21, 38, 49, 216/88, 95, 100; 65/389, 429; 430/321, 322, 324, 944, 945

(56) References Cited

U.S. PATENT DOCUMENTS

| | | | | |
|---|---|---|---|---|
| 5,406,573 A | * | 4/1995 | Ozbay et al. | 372/43 |
| 5,998,298 A | * | 12/1999 | Fleming et al. | 257/17 |
| 6,145,342 A | * | 11/2000 | Bayya et al. | 65/17.2 |
| 6,163,638 A | * | 12/2000 | Eggleton et al. | 359/161 |
| 6,291,797 B1 | * | 9/2001 | Koyama et al. | 216/65 |
| 6,358,854 B1 | * | 3/2002 | Fleming et al. | 438/692 |
| 2001/0055831 A1 | * | 12/2001 | Daneman et al. | 438/51 |

OTHER PUBLICATIONS

Fleming, J.G. and Lin, S., "Three–dimensional photonic crystal with a stop band from 1.35 to 1.95 $\mu$m," Optics Letters, vol. 24, No. 1, Jan. 1, 1999, pp. 49–51.

Yamamoto, N. and Noda, S., "100–nm–Scale Alignment using Laser Beam Diffraction Pattern Observation Techniques and Wafer Fusion for Realizing Three–Dimensional Photonic Crystal Structure," JPN. J. Appl. Phys., vol. 37 (1998), pp. 3334–3338. 6/98.

"Glasses and Amorphous Materials," Materials Science and Technology, vol. 9, J. Zarzycki, ed., John Wiley and Sons (1991), pp. 438–441.

Ozbay, E., "Micromachined Photonic Band Gap Crystals: From Microwave to the Far–Infrared," Photonic Band–Gap Materials, C.M. Soukoulis ed., Kluwer Academic Publisher (1996), pp. 41–61.

* cited by examiner

Primary Examiner—Anita Alanko
(74) Attorney, Agent, or Firm—Lerner, David, Littenberg, Krumholz & Mentlik, LLP (57) ABSTRACT

Method of making a three-dimensional photonic band-gap crystal, in which a three-dimensional structure is built by successively forming a plurality of superimposed layers of photosensitive chalcogenide and creating a predetermined grating on each of them. A layer of photoresist is superimposed on each chalcogenide layer. The chalcogenide glasses are chosen among those that are photosensitive, have a high refractive index, a high ratio of high etching speed to low etching speed of at least 10. The refractive index of the glasses may be higher than 2.5. The ratio of high etching speed to low etching speed of the glasses may be at least 10.

20 Claims, 12 Drawing Sheets

FIG. 1

FIG. 2A
PHASE 1
STEP 1

FIG. 2B
PHASE 1
STEP 2

FIG. 2C
PHASE 1
STEP 3

FIG. 2D
PHASE 1
STEP 4

FIG. 2E
PHASE 1
STEP 5

FIG. 3A
PHASE 2
STEP 1

FIG. 3B
PHASE 2
STEP 2

FIG. 4A
PHASE 3
STRUCTURE WITH
PHOTORESIST

FIG. 4B
PHASE 3
STRUCTURE WITHOUT
PHOTORESIST
(AFTER ACETONE)

METHOD FOR MAKING THREE-DIMENSIONAL PHOTONIC BAND-GAP CRYSTALS

FIELD OF THE INVENTION

This invention relates to a method for making three-dimensional photonic band-gap crystals and to the crystals obtained by said method.

BACKGROUND OF THE INVENTION

For several years, the art has tried to develop satisfactory methods of building photonic crystals with a full gap in three dimensions. The band-gap of a photonic crystal is a range of forbidden frequencies within which light cannot be transmitted through the crystal, and results from a regular array of dielectric material. To make a band-gap photonic material, a large contrast is needed in the dielectric constant between the range of material, such as a semiconductor or a metal, and the surrounding medium, usually air. The lattice spacing in a photonic band-gap must be comparable to the wavelength it is desired to block; the fraction of the volume occupied by the high-dielectric material must be relatively low; and the material must not be a strong absorber of the radiation.

A procedure for fabricating a photonic crystal, that has been described in the art, is to stack rods of dielectric materials in layers, each successive layer being oriented at right angles to the layer underneath. According to the art, the rods must be offset in every other row by half their period, viz. half the distance between corresponding points of successive rods of the same layer. J. C. Fleming and Shawn-Yu Lin, in "Three-dimensional photonic crystal with a stop band from 1.35 to 1.95 $\mu$m", Optics Letters, Vol. 24, No.1, 1999, describe the creation of 3D photonic crystals by a combination of silicon-processing techniques. By a succession of film deposits, patterning and etching, they obtain layers of one-dimensional rods with a stacking frequency that repeats itself every four layers. In each layer the rods are parallel to each other and have a fixed pitch and the orientation of the rods on alternate layers is rotated by 90 degrees.

N. Yamamoto and S. Boda, in "100-nm-Scale Alignment using Laser Beam Diffraction Pattern Observation Techniques and Wafer Fusion for Realizing Three-Dimensional Photonic Crystal Structures", J. Appl. Phys. Vol. 37, pp.3334–3338, 1998, have proposed a method of making photonic crystals, which comprises the following steps:

1—forming a photonic crystal layer and etching stop layer on a substrate by epitaxial growth;
2—forming two-dimensional structures by semiconductor microfabrication technique, such as electron beam lithography and reactive ion etching;
3—stacking face to face two wafers produced in step 2 and fusing them by the wafer fusion technique;
4—selectively and successively etching the substrate and the etch stop layer on one side of the fused wafer;
5—cleaving the wafer drops thus obtained into two pieces; and
6—repeating the steps of wafer fusion (step 3) and the selective etching (step 4) to construct a three-dimensional structure.

When stacking wafers with striped layers precise alignment is required, and the accuracy of the alignment should be less than the operating wavelength. The aforesaid authors propose an alignment method based on the observation laser beam diffraction by the striped patterns, which act as diffraction gratings.

While the method of Yamamoto and Boda is effective, it requires ultrahigh resolution lithography as well as a large number of lithographic steps. Moreover, since this method employs high temperature deposition processes, it is not compatible with organic compounds mixing, which constitute an emerging class of inexpensive, high efficiency optical materials.

It is therefore a purpose of this invention to provide a method for making three-dimensional photonic band-gap crystals which is free of the drawbacks of the prior art and particularly does not require the said ultrahigh resolution lithography.

It is another purpose of this invention to provide such a method that is more economical than those of the prior art, at least for runs up to millions of devices, and is particularly suited for customization.

It is a further purpose of this invention to provide such a method that uses materials that are transparent over a very large optical range, from the visible to the far infrared.

it is a still further purpose of this invention to provide such a method that does not require large manufacturing installations, and in particular does not require ultra-clean clean rooms.

SUMMARY OF THE INVENTION

The method of the invention is based on the use of chalcogenide glasses. Chalcogenide glasses are glasses containing chalcogen elements, viz. sulfur, selenium or tellurium. A photosensitive chalcogenide glass has the characteristic of modifying its chemical and optical properties when illuminated by a light of the appropriate wavelength, When it is placed in an etching solution, the glass is attacked by the solution, but the etching speed is not the same for the regions that have been illuminated and those that have not been illuminated. If the speed in the illuminated regions is the higher, the glass acts as a positive photoresist. If it is lower, it acts as a negative photoresist. If the ratio of the high etching speed to the low etching speed is high, the transition between the illuminated and the non-illuminated regions is sharp. Chalcogenide glasses are discussed in the chapter on Chalcogenide Glasses in "Glasses and Amorphous Materials,", J. Zarzycki Ed., John Wiley and Sons, 1991.

The chalcogenide glasses that are preferred in this invention are those that are photosensitive, have a high enough refractive index, e.g. higher than 2.5, and a ratio of high etching speed to low etching speed of at least, and preferably more than, 10. Most preferred are the chalcogenide glasses chosen from AsSe, AsSeTe and AsS.

The process of the invention comprises building a three-dimensional structure by writing a series of gratings, wherein the grating material is chalcogenide glass, preferably one of the preferred chalcogenide glasses. Preferably, the writing is done using a simple interference scheme, and alternate position of chalcogenide and photoresist polymer.

More specifically, the process of the invention comprises a number of phases, each including a number of steps, as follows:

Phase I—Creating a first layer, by:
a—depositing a first chalcogenide layer or film on a substrate;
b—writing a first predetermined grating on the chalcogenide film, preferably using cw light;
c—etching the resulting illumination pattern;

d—covering the patterned structure with a first photoresist polymer layer, so as to obtain a thin flat layer on top of said etched chalcogenide structure, preferably using spin-coating technique;

e—chemically polishing said first photoresist polymer layer.

Phase II—Creating a second layer, by:

a—depositing a second chalcogenide layer on top of the aforesaid polymer layer;

b—writing a second grating on said second chalcogenide film, perpendicular to said first grating;

c, d and e—repeating steps c, d (using a second photoresist polymer layer), and e of Phase I.

Phase III—Creating a third layer, by:

a—depositing a third chalcogenide layer on top of the second photoresist polymer layer;

b—aligning the setup and writing a third grating parallel to the first grating of the first layer obtained in Phase I, while translating in the plane of that grating perpendicularly to the grooves by half a period;

c, d and e—repeating steps c, d (using a third photoresist polymer layer) and e of Phase I.

Phase IV—Creating a fourth layer by:

a—depositing a fourth chalcogenide layer on top of the third polymer layer;

b—aligning the setup and writing a fourth grating parallel to said second grating of the second layer, while translating the plane of that grating perpendicular to the grooves by half a period;

c, d and e—repeating steps c, d (using a fourth photoresist polymer layer) and e of Phase I.

The expression "writing a grating" on a photosensitive layer is to be construed as meaning illuminating the photosensitive layer according to a predetermined illumination pattern, so that when the layer is etched and the illuminated or non-illuminated portions are removed (according to whether the photoresist is positive or negative), said pattern is translated into an alternation of peaks and valleys. In this invention, the pattern consists in a plurality of straight, parallel rows, that are of equal width and equally spaced, the width of each row being generally equal to the distance between each pair of successive rows. Such a pattern is similar to that generated by a plurality of rods laid parallel to one another and at regular intervals from one another.

A block of four layers has thus been obtained. More layers should be created, in the same way, by repeating the same operations as many times as is required to achieve the desired number of layers. Generally, an increasing number of layers improves the quality of the crystal. It is estimated that sixteen layers, viz. four four-layers blocks, can be considered as infinite crystal, and therefore, in principle, repeating the aforesaid four phases four times should be sufficient.

Optionally, the whole structure thus obtained is placed in a bath of acetone or other solvent of the photoresist, whereby to remove all the photoresist, leaving a composite structure of a chalcogenide glass and holes. This step produces a crystal having the best properties and is therefore preferred. However, it is an additional manufacturing step, which has a cost, and therefore can be omitted if the crystal is intended for an application for which some reduction in the crystal's properties, resulting from its omission, is acceptable.

The substrate, on which the first chalcogenide layer is deposited can be of any convenient material, since it supports the photonic crystal but has no part in its operation. Non-limitative examples of support materials are glass, GasAs, Silicon, and Sapphire. It thickness is not critical, and may vary, by way of non-limitative example, from a few tens of microns to a few millimeters, or even centimeters (in the case of an optical window or a long device).

The spin-coating technique is well known to persons skilled in the art. It is preferably used repeatedly in the process of the invention, each time by depositing a small quantity of photoresist on the chalcogenide glass and rotating the whole at a fast rate (for example, from 4000 to 7000 RPM) so that the photoresist is spread uniformly over the chalcogenide glass.

The steps, hereinbefore mentioned, of set-up alignment and translation in the plane of the grating perpendicularly to the grooves, will be particularly described hereinafter.

BRIEF DESCRIPTION OF THE DRAWINGS

In the drawings:

FIGS. 2, A–E, schematically illustrate the five steps of the first phase of the process;

FIGS. 3, A and B, illustrate the first two steps of the second phase of the process of the invention;

DETAILED DESCRIPTION OF PREFERRED EMBODIMENTS

Ways of carrying out the basic operations of the process according to preferred embodiments of the invention will now be described. Since said operations are repeated in different phases of the process, the object on which they are carried out depends on the particular phase and accordingly will include a smaller or larger number of layers. Therefore, the expression "intermediate structure", or sometimes "the sample", will be used to designate the structure generated up to the stage in which the operation is carried out, which intermediate structure may comprise a single chalcogenide layer or a plurality of such layers.

1) Deposition of Chalcogenide Films

Figure 2A:
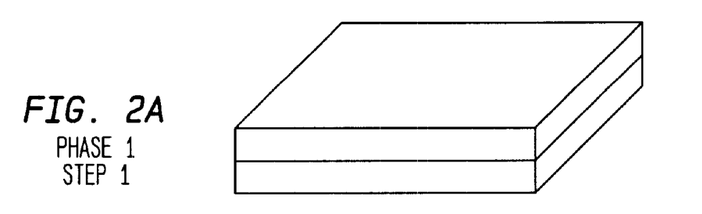
Figure 3A:
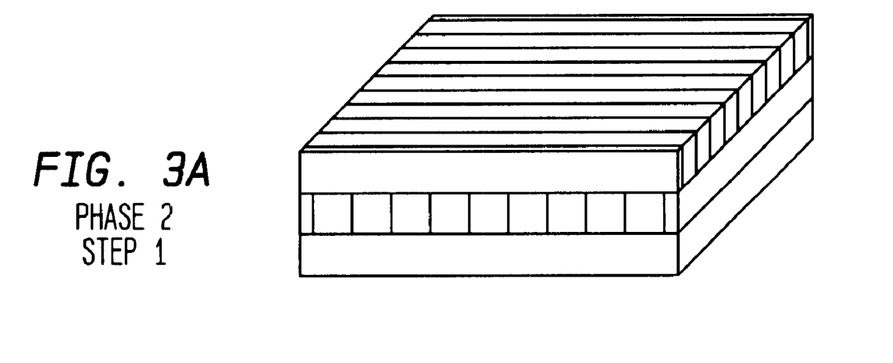

The deposition of a chalcogenide film on a suitable substrate constitutes the first step of each phase of the process of the invention and is schematically illustrated for the first phase in FIG. 2A and for the second phase in FIG. 3A. The chalcogenide film is deposited preferably by evaporating crushed bulk chalcogenide glass from a quartz crucible in a vacuum, e. g. of $(2-5) \times 10^{-6}$ Torr at room temperature. In order to improve the adhesion on the substrate, which is important because of the chemical treatments, particularly the etching, which is repeated for every layer of the crystal, it is possible to add a thin adhesion layer, which can be either:

- an organic layer which acts as a promoter, the use of which is well known in photolithographic processes to increase the adhesion between the film and the substrate;
- a chalcogenide thin layer which can be completely illuminated in order to avoid its etching, since the chalcogenide acts as a negative photoresist;
- a chalcogenide thin layer deposited using a sputtering technique.

2) Writing the Grating on the Chalcogenide Films.

Figure 2B:
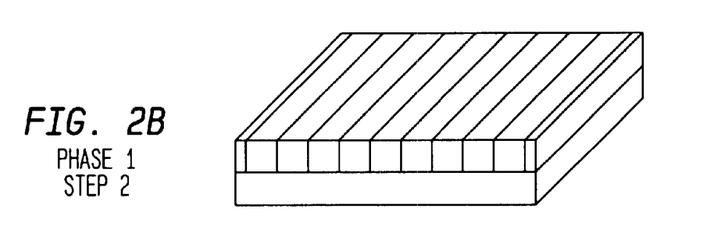
Figure 3B:
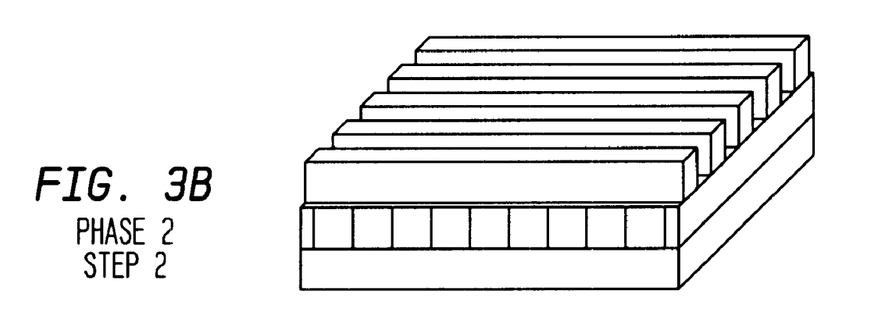

Writing the grating constitutes the second step of each phase of the process of the invention and is schematically illustrated for the first phase in FIG. 2B and for the second phase in FIG. 3B. Cw light is preferably used in this operation. The writing on the film is done using interferometry. Two beams coming from the same laser interfere on the chalcogenide film and create an interference pattern. Since the chalcogenide is photosensitive, this pattern is written on the chalcogenide film. Writing with cw light is a relatively new, low efficiency process, which typically requires several minutes of illumination for a few hundreds nanometers to two microns thick chalcogenide film. This requires a vibration-free setup. When the preferred chalcogenide glasses hereinbefore mentioned are used, examples of acceptable cw lasers are the following:

HeNe (Helium-Neon) laser at 632 nm;
diode laser with long coherence length (in the range of 660 nm to 750 nm);
krypton laser with etalon (647 nm, 678 nm and 750 nm).

The choice of the optimal writing wavelength is essentially determined by the following parameters:

the absorption of the chalcogenide layer (chalcogenide composition)
layer thickness
structure periodicity (periodicity of the crystal in the plane perpendicular to its growth).

A simulation of the process, taking into account all these parameters, allows to determine the best writing conditions.

Pulsed lasers can also be used, since the sensitivity of chalcogenide glasses to pulsed excitation is particularly high. However, for large samples, cw illumination is preferable, since it gives a better contrast all over the sample (high coherence length).

The writing process should be carefully controlled to optimize it. If the illumination duration is too short, only a hollow grating is written. If it is too long, the high intensity region saturates while the low intensity region starts to be written, resulting in a poorer grating. The writing can be monitored in real time using the first diffracted beam from a probe beam (see FIG. 5).

Figure 5:
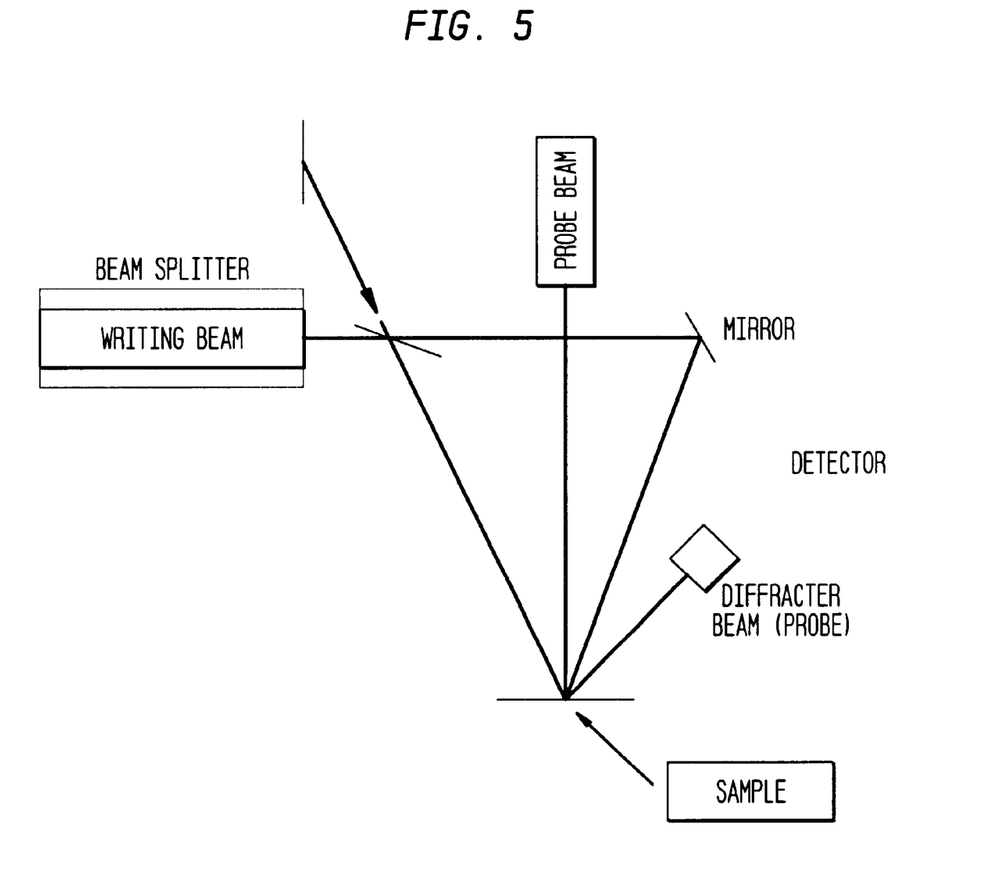
FIG. 5 schematically illustrates the writing operation.

FIG. 5 schematically illustrates the writing operation. A laser writing beam is separated by a beam splitter into two equal intensity beams that interfere on the surface on which the writing is to be effected (indicated in the drawing as "sample"). A second light beam is sent to the sample at a wavelength in which the sample does not absorb, in order to probe the grating formation. The diffracted probe beam is detected using a lock-in detection system (not shown in the figure).

Figure 6:
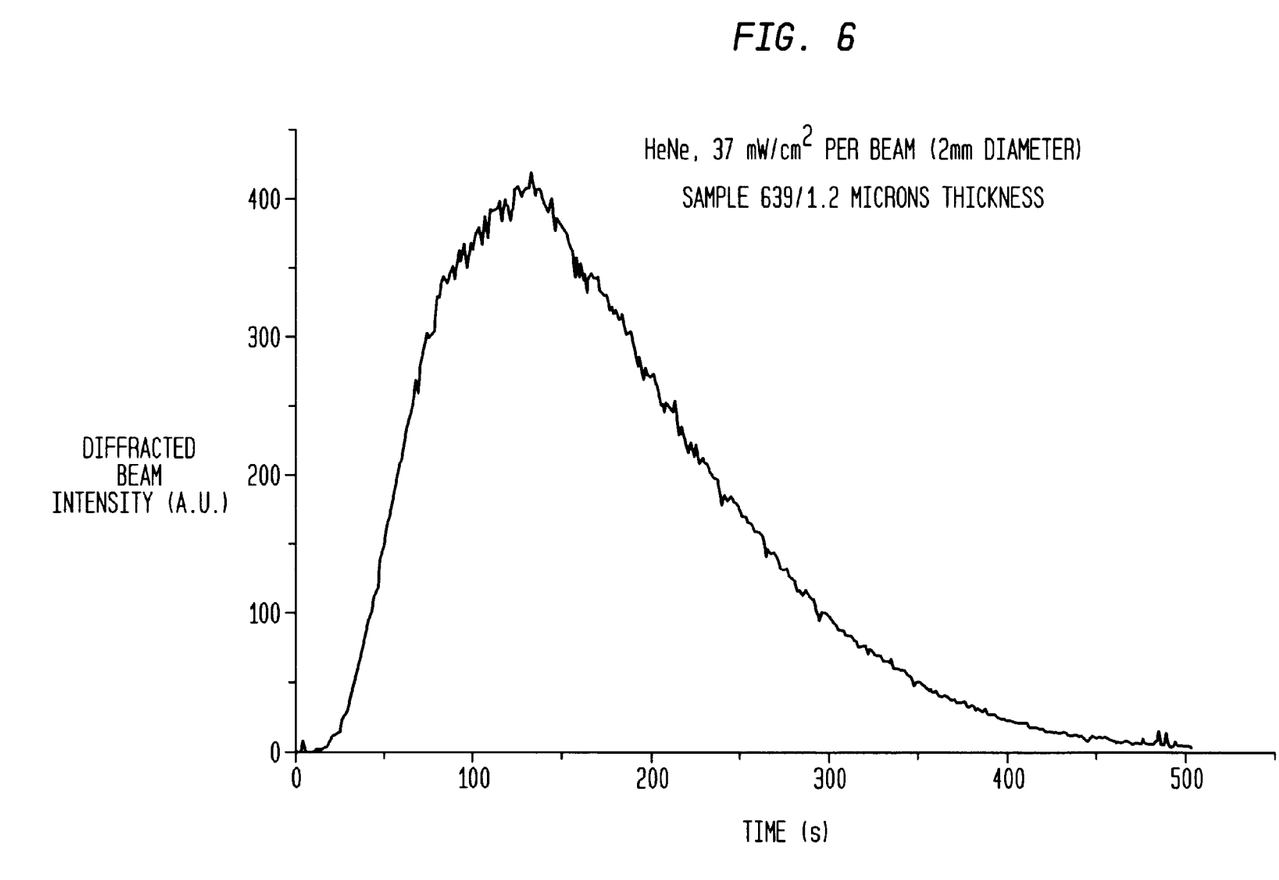
FIG. 6 is a plot of diffracted beam intensity versus time.

The signal is diffracted to a certain angle depending on the angle between the two writing beams. Typical results are shown in FIG. 6, which is a diagram having the times in seconds as the abscissa and the signal amplitude (diffracted beam intensity) in arbitrary units (A.U.) as the ordinate, relating to a photonic crystal having a layer thickness of 1.2 microns and to a probe beam having a diameter of 2 mm and an intensity of 37 mW/cm$^2$. The signal amplitude is proportional to the square of the optical peak-to-valley height (the geometrical height times the refractive index of the material) of the grating. At short times, the signal is proportional to the square of the input power. This means that the grating formation is initially proportional to the input intensity. However, as the illuminated regions start to saturate, there is a reduction in the writing efficiency. After reaching an optimum, the efficiency starts to reduce, because the strongly illuminated regions have already saturated areas whereas the poorly illuminated regions start to be photoexcited. At very long times, the film is homogeneously photoexcited and the grating efficiency is null. Therefore, knowing how the said signal amplitude varies with time, and since it is related to the peak-to-valley height of the grating, permits to finely control the exposure time to obtain an optimum writing level.

According to the wavelength of excitation, the typical writing fluence can vary from a few mJ/cm$^2$ (AsSe chalcogenide with HeNe laser illumination), to tens of mJ/cm$^2$ (AsSeTe chalcogenide with 690 nm diode laser illumination).

3) Etching of the Illumination Pattern

Figure 2C:
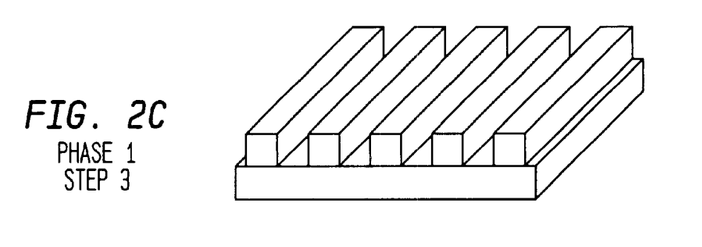

Etching constitutes the third step of each phase of the process and is schematically illustrated for the first phase in FIG. 2C. This etching is important for controlling the exact geometric parameters. Once the writing has been performed, it is necessary to etch the sample in an etching solution, e. g. a solution of an amine based developer, such as ethanolamine or ethylenediamine. The chalcogenide glasses used according to this invention are so-called negative photoresists, which means that the non-illuminated regions are removed at a greater speed than the illuminated regions. Correspondingly, the etching time required to remove the illuminated regions is longer than that required to remove the illuminated regions, by a factor that, in the process of the invention, may vary from 10 to a few hundreds, and may typically be about 20. The etching time for the non-illuminated regions is generally from 10 to 120 seconds, and preferably is about 30 seconds, while correspondingly the preferred etching time for the illuminated regions is about 80 seconds.

Figure 7:
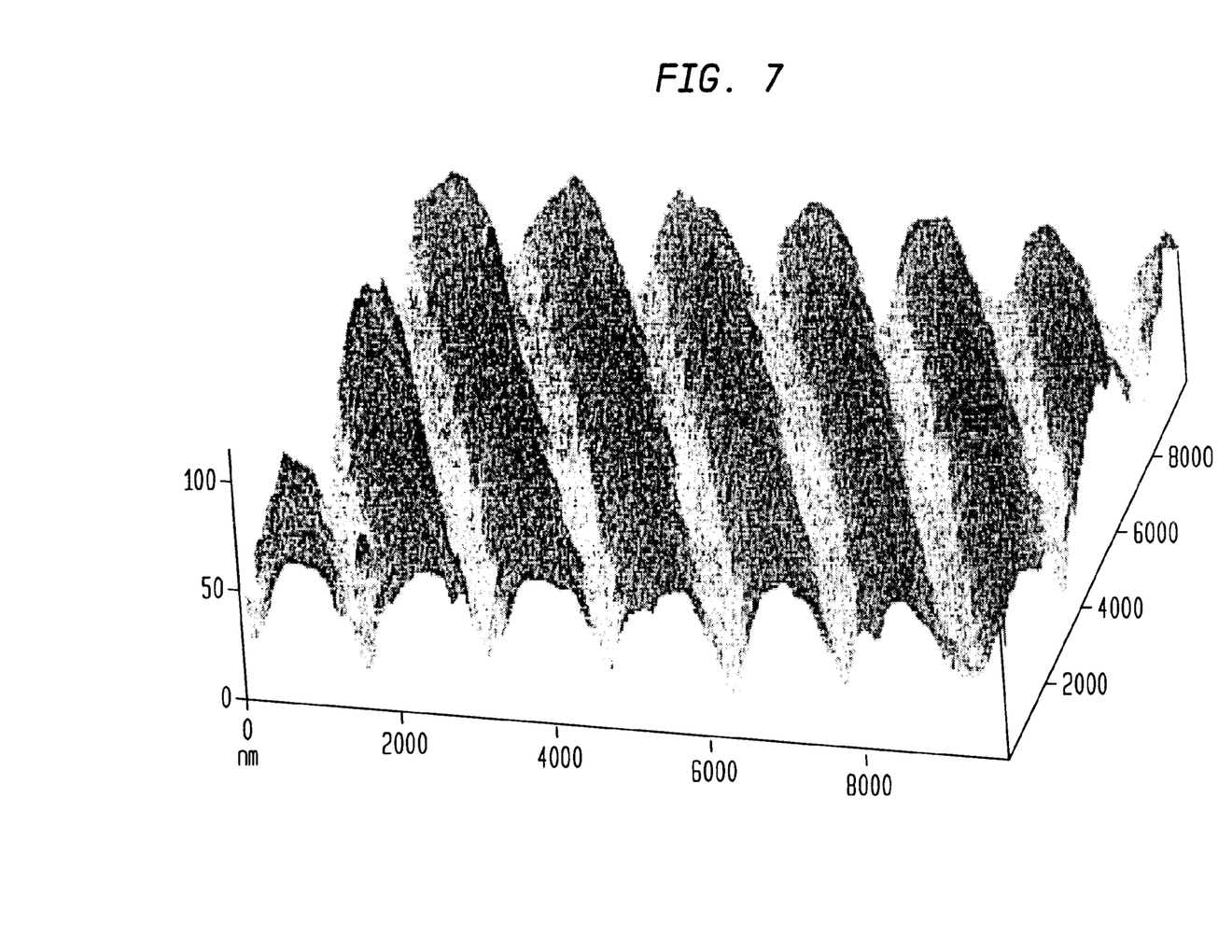
FIG. 7 shows an example of surface obtained by microscopy, after etching.

The etching too can be optically monitored using the diffraction properties of the surface of the intermediate structure to finely control the amount of etched glass. FIG. 7 shows an example of the surface obtained by Atomic Force Microscopy, after etching of the sample. The units of the coordinate axes Y, Y and Z are nanometers.

4) Covering of the Patterned Structure with Photoresist Polymer

Figure 2D:
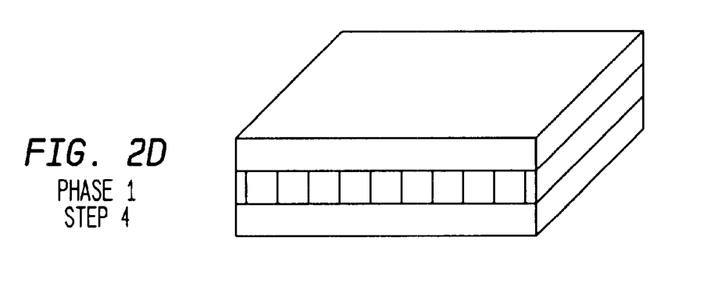

This constitutes the fourth step of each phase of the process and is schematically illustrated for the first phase in FIG. 2D. Once the chalcogenide film has been etched, the valleys generated on its surface must be filled so that it is possible to deposit a new chalcogenide film on top. This can be done e.g. by spin-coating a thin polymer layer on top of the etched intermediate structure. Said layer will be removed at the end of the process by placing the intermediate structure obtained into an acetone bath, which leaves the chalcogenide film untouched.

The polymer used should have the following properties:

it can be deposited on chalcogenide with a relatively good adhesion;
it can be dissolved with a solvent that does not attack the chalcogenide glass;

it is not harmed by chalcogenide developers;

optionally, it has photoresist properties.

Any polymer that has the aforesaid properties can be used in carrying out the invention. Further, it is desirable that the polymer should have a low viscosity, so that it can penetrate the tiny etched lines of the chalcogenide, and should have a strong enough absorption of the illuminating light (that will be used as set forth in describing the next step), so that only a thin layer of the film formed with it will be photosensitized by said light. A suitable such polymer is, e. g., the photoresist Microposit S1800 made by Shipley Europe (Coventry, UK), but several other photoresists are suitable as well.

It should be noted that it is not necessary to use polymers having narrowly defined photoresist properties, since it is possible to predetermine the etching rate of a given polymer and then etch it according to this rate. This is particularly interesting in the case of active polymers (such as electroluminescent polymers, laser polymers, or electrooptic polymers), which can then be introduced to make the device active. For devices which do not require a full band-gap, it is not necessary to remove the polymer. If the polymer has other physical properties, like the above active polymers, it may provide the device with a broad range of possible applications. This can hardly be achieved with silicon or gallium arsenide structures, because the high temperatures required for material growth make it difficult to introduce a polymer during crystal fabrication and the very small dimensions of the structure make it difficult to introduce it afterwards.

Figure 8:
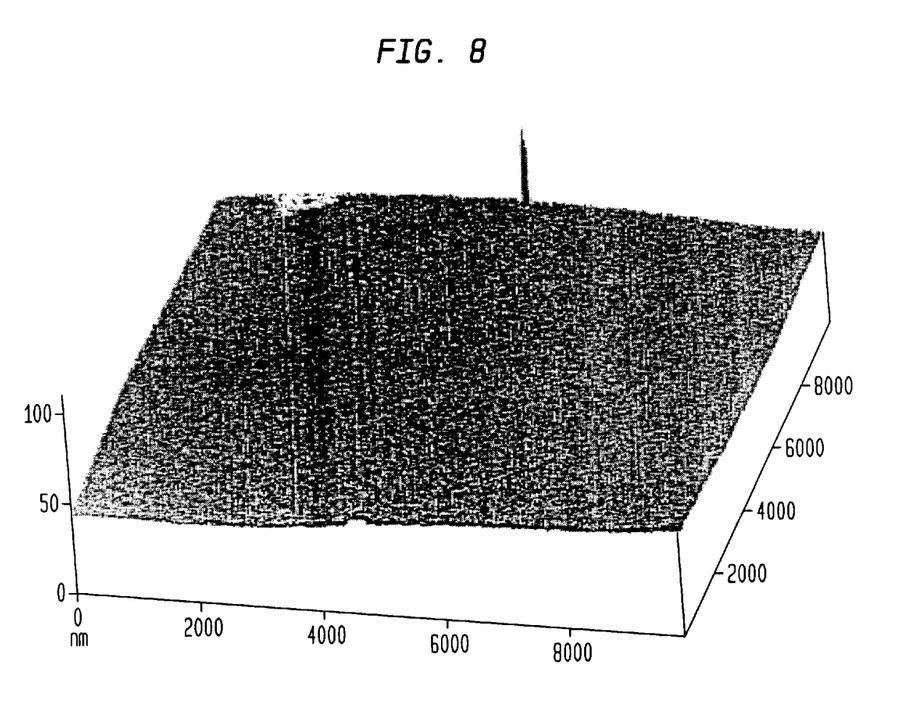
FIG. 8 illustrates a photoresist covering.

FIG. 8 illustrates, in the same coordinate system as FIG. 7, the photoresist covering with 0.5 micron thick photoresist layer of a grating similar to the one illustrated in said FIG. 7.

5) Chemical Polishing of the Polymer

Figure 2E:
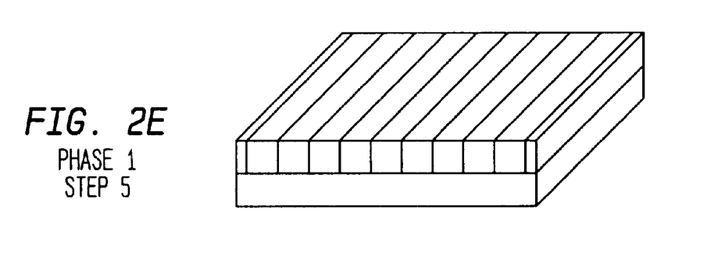
Figure 9:
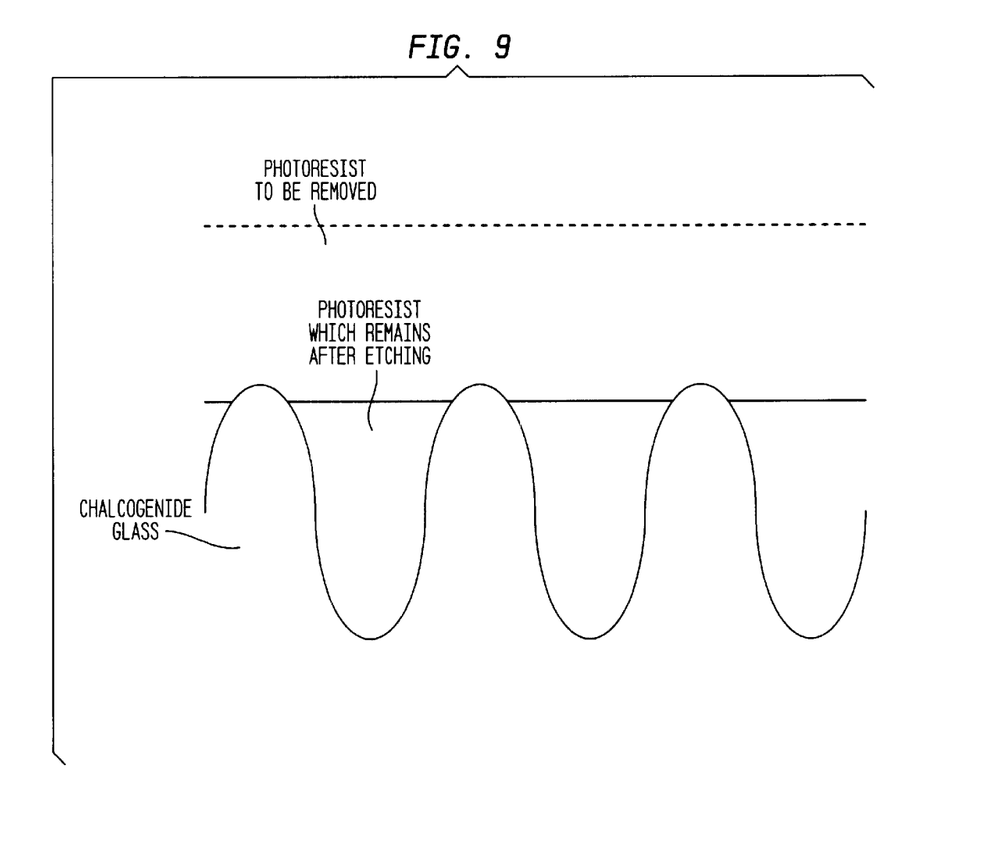
FIG. 9 schematically illustrates the removal of photoresist material.

This stage consists in removing the photoresist material down to the chalcogenide glass so that only the top of the chalcogenide pattern appears from the flat surface, as schematically illustrated in FIG. 9. The result of this step is schematically illustrated for the first phase in FIG. 2E. Therefore the etching of the photoresist layer must be finely controlled. In order to do so, said layer is uniformly illuminated with UV light for a predetermined time, and then the intermediate structure, as it is in the phase of the process that is being carried out, is immersed into a photoresist developer. The illuminating UV light is chosen so that its wavelength band is one that the photoresist absorbs very strongly. Thus, the penetration depth of said light is very small and the photoresist is only partially sensitized in the Z direction (the direction perpendicular to the polymer layer surface). The etching stops when said penetration depth has been reached.

The penetration depth can be controlled by the following parameters:

the illumination time and/or intensity;

the concentration of the photoresist solution;

the absorption of the photoresist.

Figure 10:
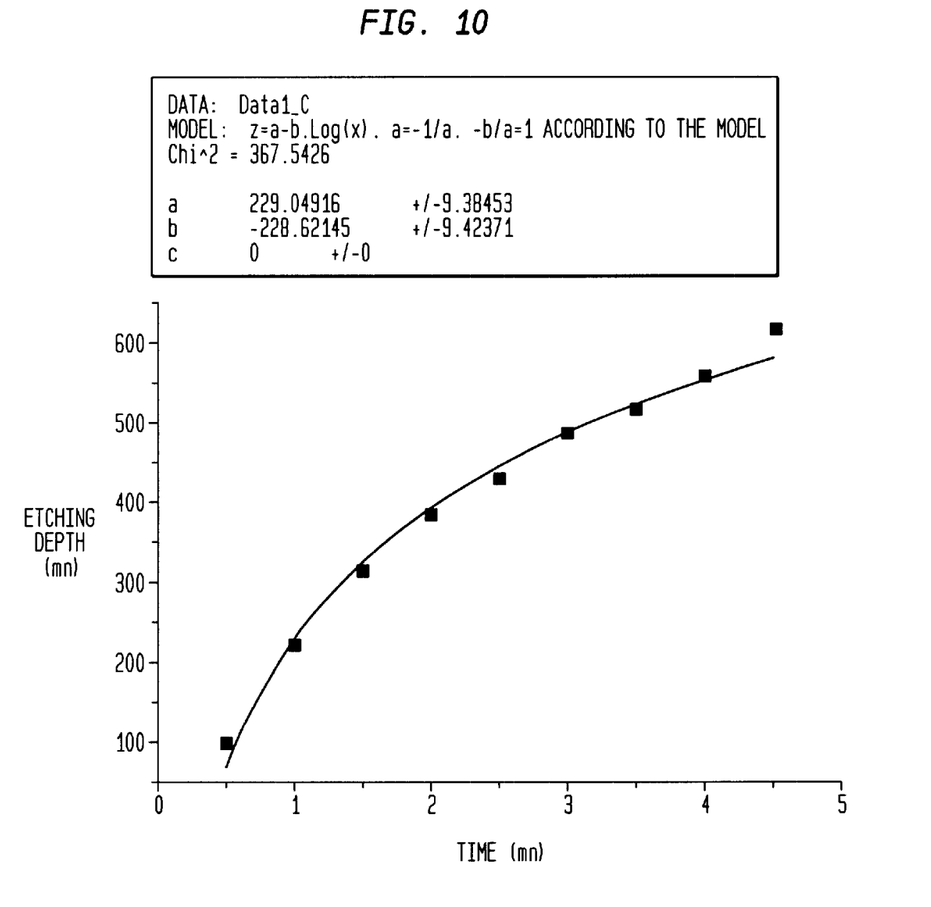
FIG. 10 is a plot of etching depth versus time.

In FIG. 10, the total etched depth is plotted as a function of the exposure time, for a 2.5 W germicidal UV lamp situated at approximately 30 cm from the sample. The etching depth follows the following law: $Z=(1/\alpha) \ln(Wt/l_\tau)$, wherein W is the UV light power, t the illumination time, $l_\tau$ the photoresist light energy threshold, and a (expressed in $cm^{-1}$) is defined by the factor $e^{\alpha d}$, which is the ratio by which the light intensity is reduced by passing through a layer of photoresist having a thickness of d cm. With the photoresist hereinbefore mentioned and the said UV lamp, $\alpha=4.4\times10^4$ $cm^{-1}$, and $l_\tau/W=23$ s.

6) Alignment

Figure 1:
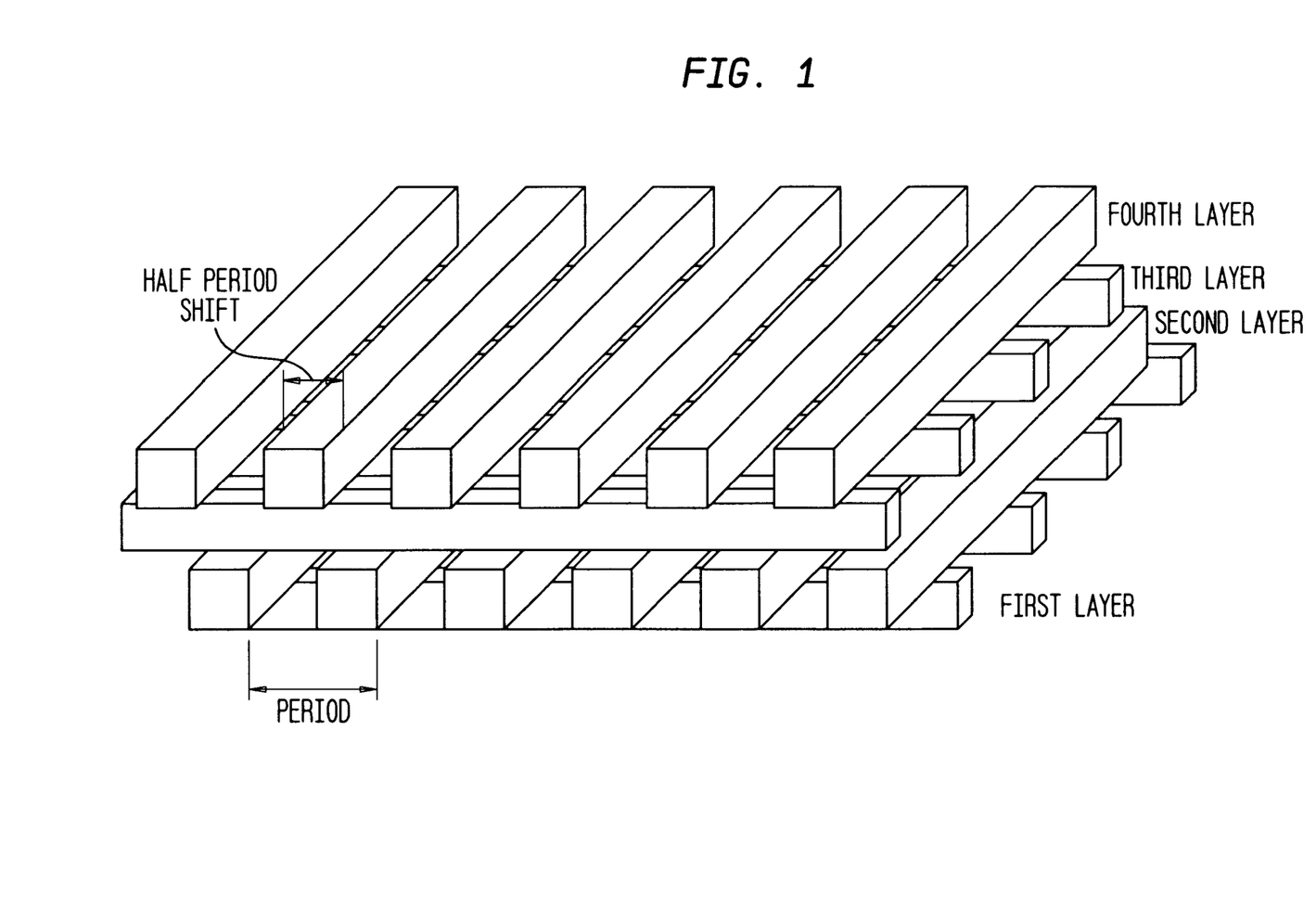
FIG. 1 is a schematic illustration of a portion of a structure including four layers created according to the invention.

The alignment is a crucial part of the structure's building. In FIG. 1, a partial three-dimensional structure is shown with the shift between the first and the third layers, as well as the shift between the second and fourth layers. A preferred method for performing the alignment is the following, schematically illustrated in FIG. 11.

Figure 11:
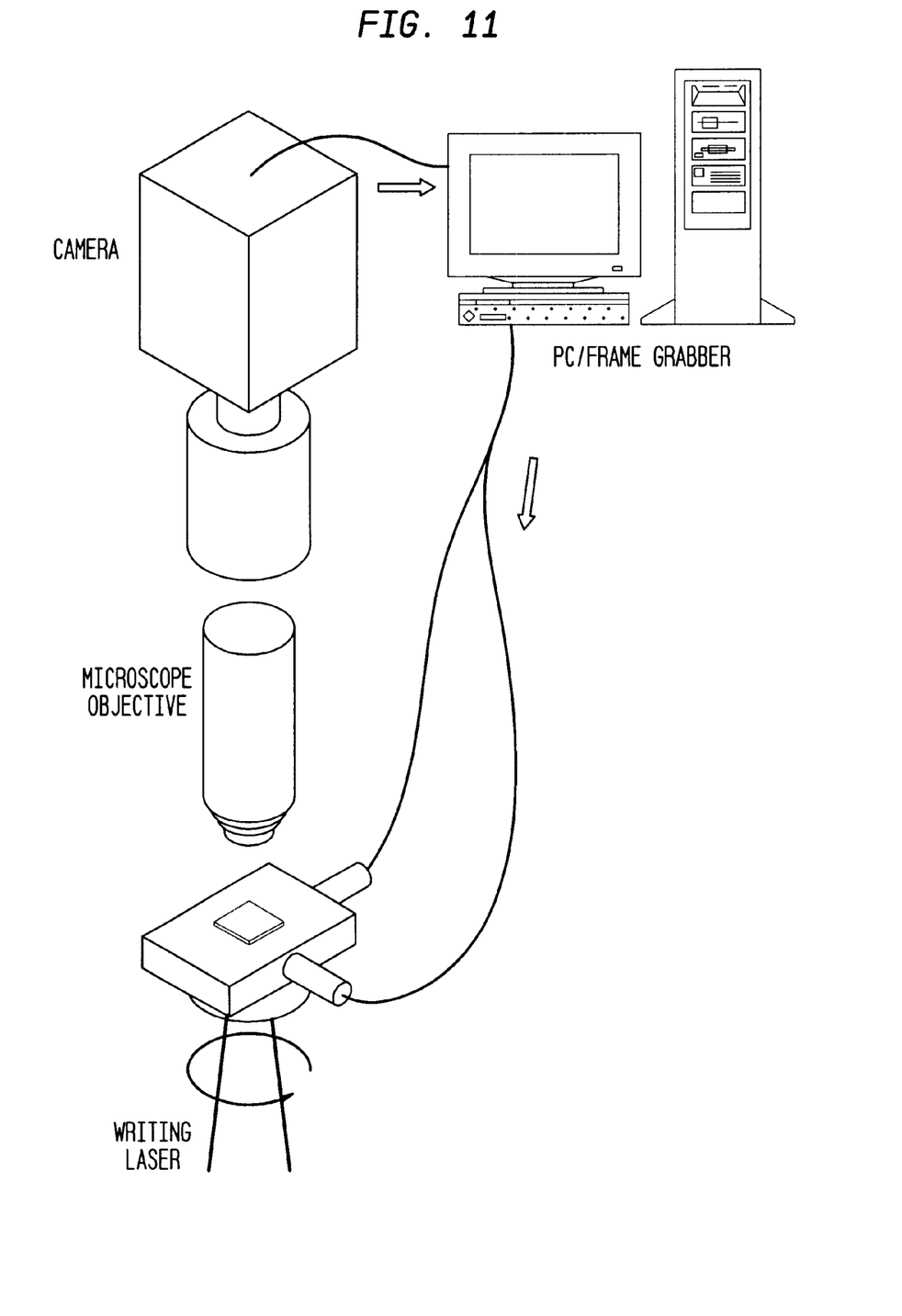
FIG. 11 schematically illustrates a method of performing alignment.

Firstly, a substrate is chosen that is thin enough so that the first layer on the substrate can be seen through the substrate (which therefore must be transparent) under microscope (reflection). In the UV range, it has been reported that lines as small as 100 nm can be observed (for example, with UV objectives from the company Leica). However, such a resolution is not necessary, with the following arrangement.

First step: Using a video camera linked to the microscope, a picture of this first layer is stored in the computer (the "reference" picture). The microscope system is included within the writing setup, so that the picture is taken when the intermediate structure stays within the setup.

Second step: After evaporation of the third layer, the intermediate structure is put inside the writing setup again. The microscope apparatus is set and video images are recorded and sent to the computer (via a frame grabber). The video image is compared to the reference picture. More quantitatively, for example, the reference picture is subtracted from the video images and a "deviation number" (for example, the sum of the square of the pixel difference values) is computed. The best alignment occurs when this number is a minimum.

A X,Y, Θ piezoelectric motion control moves the sample (X, Y control translations in the plane of the sample and Θ controls rotation in the XY plane). By adjusting the position using these actuators, and using a steepest gradient method algorithm, it is thus possible to precisely align the reference and the image of the new position. It must be noted that this alignment must be precise only for the X, Θ movements (where the X movement controls translation perpendicular to the grooves), while its precision can be much less (not even based on piezoelectric actuators) for the movement parallel to the grooves. Also, it must be noted that the position perpendicular to the grooves must be known only modulo the period of the grating (since this is a periodic motive), which limits the requirements regarding the span length of the piezoelectric transducer.

Finally, when the alignment is optimal, the piezoelectric transducer perpendicular to the grooves is translated by half a period.

The same operations are carried out for the alignment of the second and fourth layer, except that now the reference layer must be the second layer, which can be seen (at least partially) through the first layer and by proper focusing of the microscope.

An alternative procedure can be used: by writing a cross pattern on the back side of the sample (using, for example, another chalcogenide film with a different composition, so that it is not etched by the developer), it is possible to directly align the stored pattern of the back side. This allows avoiding using the structure itself as the alignment device.

7) Removal of the Photoresist Material

Figure 4A:
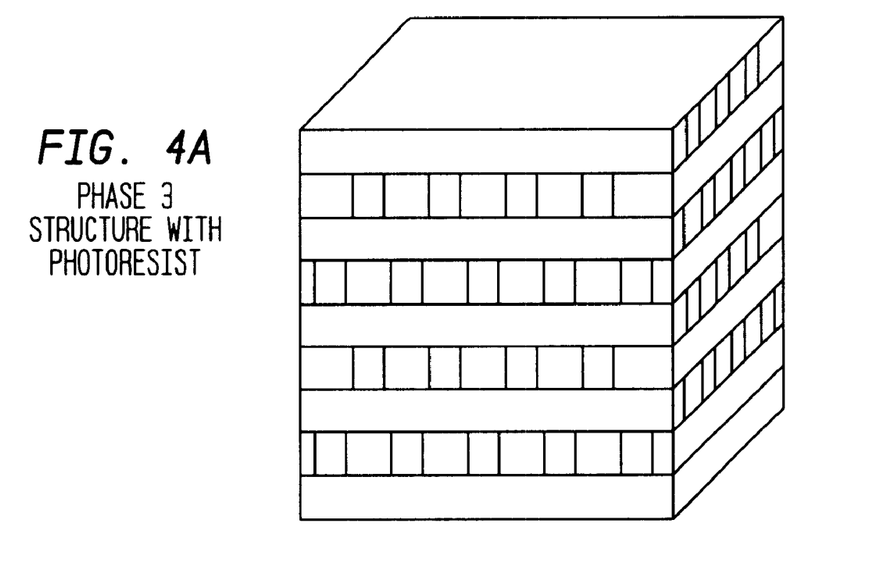
FIG. 4A illustrates a structure including eight layers, with the photoresist.
Figure 4B:
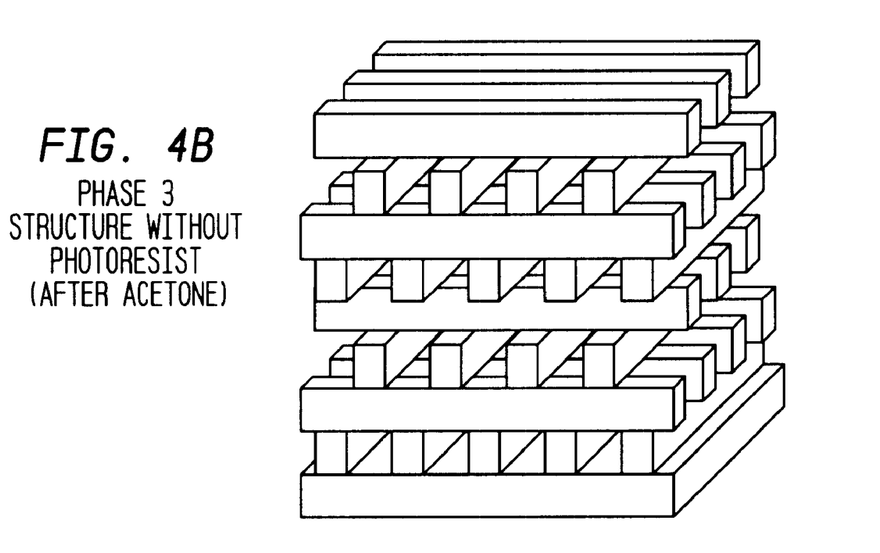
FIG. 4B illustrates the same structure after removal of the photoresist.

Once the crystal structure is completed by deposition of several layers one on top of the other, the photoresist material can be removed by immersing the whole structure in acetone. Since chalcogenide glasses are completely inert to acetone, only the organic part is removed, leaving a composite material made of chalcogenide and air. An eight-layered structure is schematically illustrated before and after removal of the photoresists in FIGS. 4A and 4B, respectively.

Figure 12:
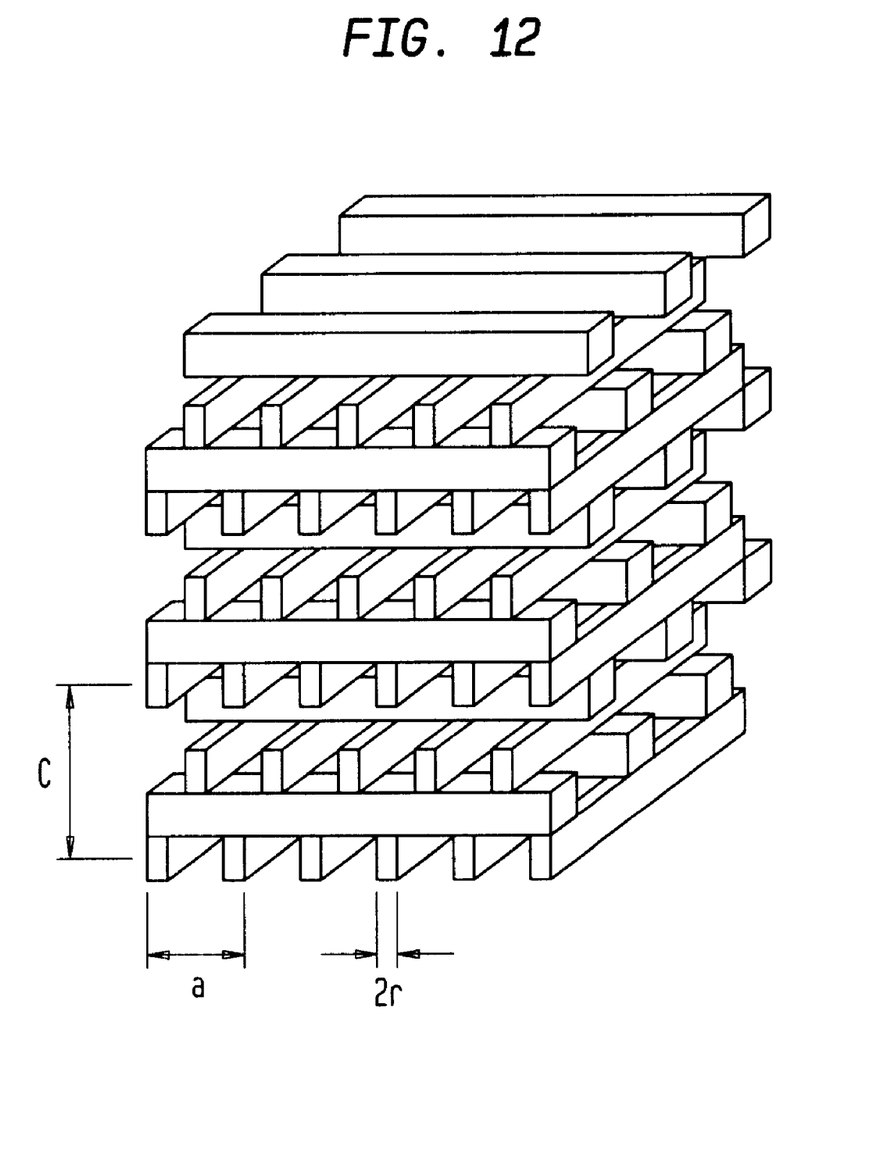
FIG. 12 schematically shows a stack of layers on which are marked certain geometric parameters.

Four important parameters that can be used to optimize the crystal structure can be described with reference to FIG. 12. They are: 1) the c/a ratio; 2) the filling ratio of the structure, that is controlled by varying the width of the rods; 3) the dielectric contrast between the two materials; and 4) the degree of overlap between the dielectric rods, if they overlap, viz. if rods of two successive layers (perpendicular to one another) are interpenetrating, viz. have common portion. A 100% overlap would in fact define a 2D grid. Rod overlapping leads to better conductivity of the electric field in the structure, which in turn leads to larger gap.

A publication that can be referred to as relevant, although it is based on structures different from those of the present invention, is E. Ozbay, "Micromachined photonic band gap crystals from microwave to the far-infrared", in Photonic band-gap materials, C. M. Soukoulis ed., Kluwer Academic Publisher (1996), p. 41–61).

8) Use of the polymer as an active device.

As described above, a polymer material can become a part of the structure, if particular properties are needed. With chalcogenide with a high enough refractive index (~3.4), and polymer with a low enough refractive index (which can be as low as 1.4), it is possible to reach the refractive index ratio necessary in order to obtain a photonic band-gap. Since the polymer can be used as a matrix for optical active organic molecules, particular properties can be passed to the entire structure, to give rise to devices such as enhanced electroluminescence devices and active filters and ultrafast modulators (a narrow defect line can be shifted by applying a voltage to the polymer and modifying its index, and thus modifying the effective periodicity of the photonic band-gap crystal).

While embodiments of the invention have been described by way of illustration, it will be apparent that the invention can be carried out with many modifications, variations and adaptations, without departing from its spirit or exceeding the scope of the claims.

What is claimed is:

1. A method of making a three-dimensional photonic band-gap crystal which comprises building a three-dimensional structure by successively depositing a plurality of superimposed layers of photosensitive chalcogenide and forming a plurality of gratings from said plurality of layers of photosensitive chalcogenide, each of gratings being formed by illuminating a corresponding one of said plurality of layers of photosensitive chalcogenide in a predetermined pattern and after illuminating said corresponding layer, etching regions of said corresponding layer as a function of said predetermined pattern before depositing another one of said layers of photosensitive chalcogenide.

2. The method according to claim 1, comprising superimposing a layer of photoresist on each of said plurality of layers of photosensitive chalcogenide after said etching step.

3. The method according to claim 1, wherein the plurality of layers of photosensitive chalcogenide are selected from the group consisting of chalcogenide glasses which are photosensitive and have a refractive index higher than 2.5.

4. The method according to claim 3, wherein the refractive index of said chalcogenide glasses is about 3.4.

5. The method according to claim 3, wherein a ratio of higher etching speed to lower etching speed of said chalcogenide glasses is at least 10.

6. The method according to claim 1, wherein the layers of photosensitive chalcogenide are selected from the group consisting of AsSe, AsSeTe and AsS.

7. The method according to claim 1 comprising the steps of:

I—Creating a first patterned layer by:
   a—depositing a first chalcogenide layer on a substrate;
   b—illuminating said first chalcogenide layer according to a first predetermined pattern;
   —etching the resulting illumination pattern, thereby generating a first grating;
   d—covering said first chalcogenide layer having said first grating with a first Polymer layer to obtain a flat layer on top of said first grating; and
   e—chemically polishing said first polymer layer;

II—Creating a second patterned layer by:
   a—depositing a second chalcogenide layer on top of said first polymer layer;
   b—illuminating said second chalcogenide layer according to a second predetermined pattern perpendicular to said first pattern;
   c—etching the resulting illumination pattern, thereby generating a second grating perpendicular to said first grating;
   d—covering said second chalcogenide layer having said second grating with a second polymer layer to obtain a flat layer on top of said second grating; and
   e—chemically polishing said second polymer layer;

III—Creating a third patterned layer by:
   a—depositing a third chalcogenide layer on top of said second polymer layer;
   b—aligning to said first patterned layer and illuminating said third chalcogenide layer according to a third predetermined pattern that is substantially parallel to said first predetermined pattern but translated in the plane of said third predetermined pattern by one half period with respect to said first predetermined pattern;
   c—etching the resulting illumination pattern, thereby generating a third grating parallel to said first grating;
   d—covering said third chalcogenide layer having said third grating with a third polymer layer to obtain a flat layer on top of said third grating; and
   e—chemically polishing said third polymer layer;

IV—Creating a fourth patterned layer by:
   a—depositing a fourth chalcogenide layer on top of said third polymer layer;
   b—aligning to said second patterned layer and illuminating said fourth chalcogenide layer according to a fourth predetermined pattern that is substantially parallel to said second predetermined pattern but translated in the plane of said fourth predetermined pattern perpendicularly to the grooves by one half period with respect to said first predetermined pattern;
   c—etching the resulting illumination pattern, thereby generating a fourth grating parallel to said second grating;
   d—covering said fourth layer having said fourth grating with a fourth polymer layer to obtain a flat layer on top of said fourth grating; and
   e—chemically polishing said fourth polymer layer;

V—repeating steps III and IV, when required, for as many times as required to generate a structure having a desired number of patterned layers; and VI—immersing said structure in a bath to remove all of said polymer layers.

8. The method according to claim 7, wherein at least part of said polymer layers comprise photoresists.

9. The method according to claim 7, wherein the illuminations steps are carried out using continuous wave (cw) light.

10. The method according to claim 7, wherein said bath for removing all of said polymers layers comprises an acetone bath.

11. The method according to claim 7, comprising repeating steps III and IV until sixteen layers have been created.

12. The method according to claim 7, further comprising improving the adhesion of the first chalcogenide layer to the substrate by adding a thin adhesion layer selected from the group consisting of an organic layer acting as a promoter, a completely illuminated chalcogenide thin layer, and a chalcogenide thin layer deposited by sputtering.

13. The method according to claim 7, including writing on a respective chalcogenide layer with an interference pattern formed from two beams coming from the same laser.

14. The method according to claim 9, wherein the cw light is generated by a laser selected from the group consisting of HeNe lasers, diode lasers and long coherence length krypton lasers with an etalon.

15. The method according to claim 7, wherein a respective chalcogenide layer surfaces are illuminated to create a grating pattern by generating a laser beam and separating the laser beam into two equal intensity beams that interfere on the surface of the layer on which the writing is to be effected.

16. The method according to claim 7, further comprising sending a probe beam onto the surface of the layer said probe beam having a wavelength which the chalcogenide does not absorb, and detecting the diffracted probe beam to probe the grating formation.

17. The method according to claim 7, further comprising controlling a time of the illumination to obtain an optimum peak-to-valley depth of the grating.

18. The method according to claim 7, further comprising aligning a given layer to an intermediate structure by the following steps:

a) storing, in a computer, a reference picture of an underlying layer obtained from a video camera linked to a microscope;

b) recording a video image of said given layer;

c) subtracting a reference picture from said image and computing a deviation number; and d) minimizing said deviation number by adjusting a position of the intermediate structure by translation and rotation.

19. The method according to claim 7, wherein the substrate is selected from the group consisting of glass, GasAs, Silicon, and Sapphire, and has a thickness of from a few tens of microns to at least a few millimeters.

20. The method according to claim 7 wherein the polymers are selected from the group consisting of polymers that can be deposited on chalcogenide glass with good adhesion, that can be dissolved with a solvent that does not attack the chalcogenide glass, that are not harmed by chalcogenide developers, that have a viscosity that is sufficiently low as to permit deposition of a further layer of chalcogenide glass on said polymer and that have a strong enough absorption of the illuminating light.

* * * * *

UNITED STATES PATENT AND TRADEMARK OFFICE
CERTIFICATE OF CORRECTION

PATENT NO. : 6,521,136 B1
DATED : February 18, 2003
INVENTOR(S) : Bruno Gad Sfez and Zvi Kotler It is certified that error appears in the above-identified patent and that said Letters Patent is hereby corrected as shown below:

<u>Title page,</u>
Item [73], Assignee "Isreal" should read -- Israel --; and "Soraq" should read -- Soreq --.

<u>Column 1,</u>
Line 33, "J.C. Fleming" should begin a new paragraph.

<u>Column 3,</u>
Line 58, delete "to remove all the photoresist" and in place thereof insert -- all of the photoresist is removed --.

<u>Column 7,</u>
Line 62, "a" should read -- α -- .

<u>Column 9,</u>
Line 44, insert the word -- the -- between "each of" and "gratings".

<u>Column 10,</u>
Line 5, insert -- c -- before "-etching".
Line 8, delete "Polymer" and in place thereof insert -- polymer --.
Line 64, delete "comprise" and in place thereof insert -- comprises --.

<u>Column 11,</u>
Line 19, delete "a".
Line 25, after the word "layer" add a comma -- , --.

Signed and Sealed this

Twelfth Day of August, 2003

JAMES E. ROGAN
*Director of the United States Patent and Trademark Office*